June 12, 1934.     L. W. SKALA     1,962,366
METHOD OF AND MEANS FOR EXAMINING AND PHOTOGRAPHICALLY
RECORDING AND REPRODUCING SPECTRA
Filed Dec. 6, 1930     3 Sheets-Sheet 1
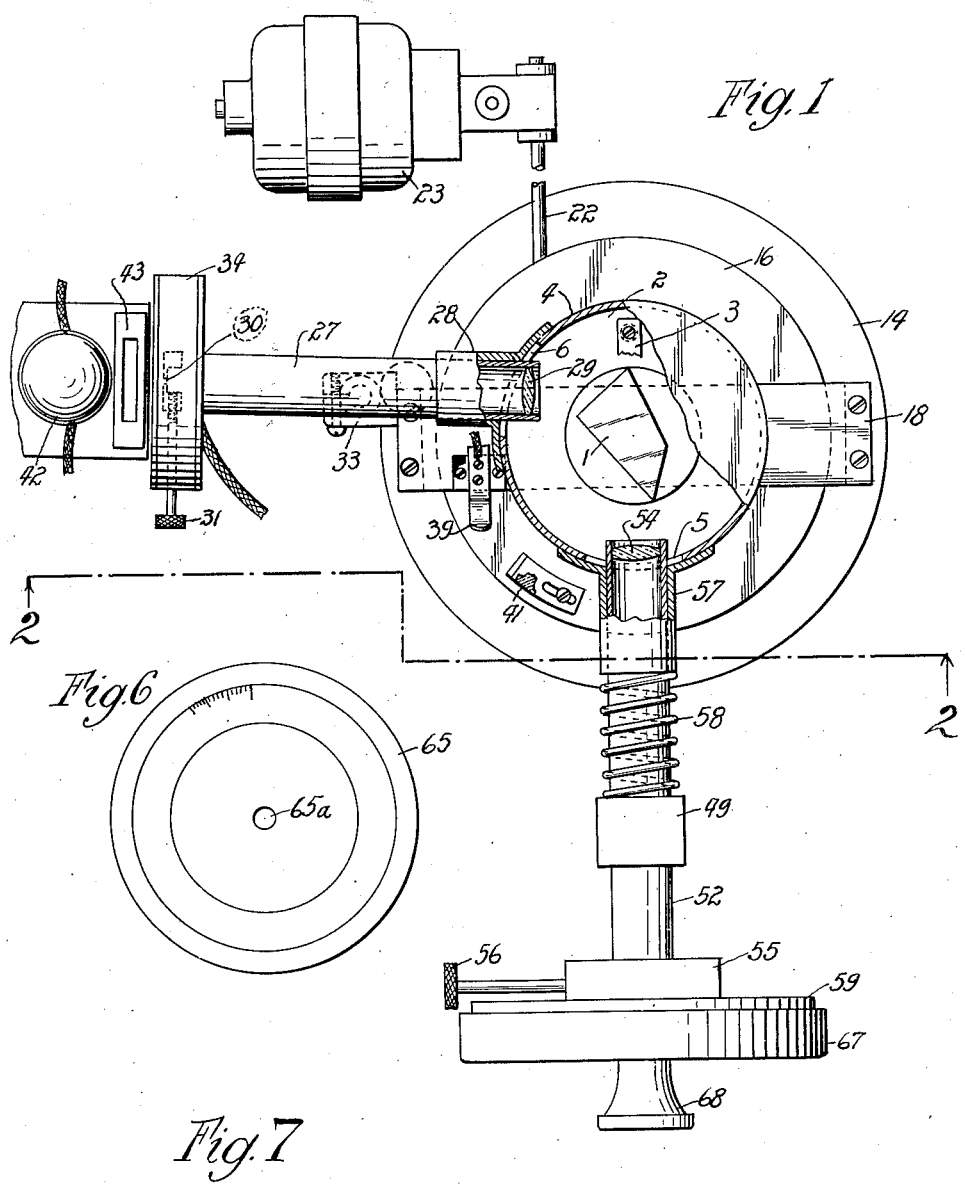
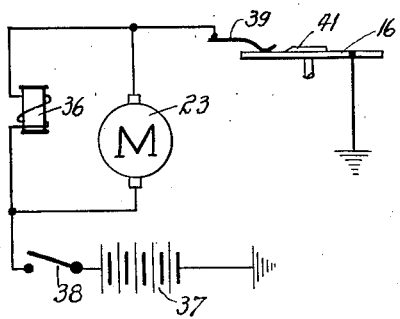
Inventor
LJUBOMIR W. SKALA
by Henry Blech
Attorney.

June 12, 1934.  L. W. SKALA  1,962,366
METHOD OF AND MEANS FOR EXAMINING AND PHOTOGRAPHICALLY
RECORDING AND REPRODUCING SPECTRA
Filed Dec. 6, 1930   3 Sheets-Sheet 2
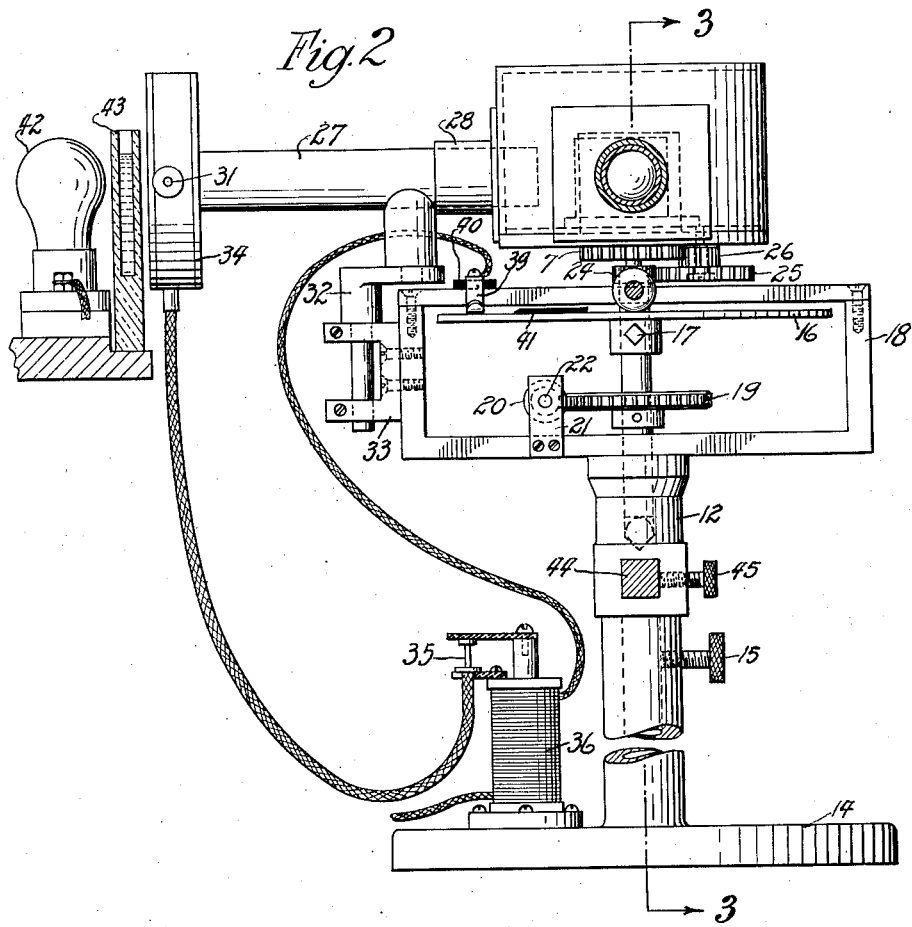
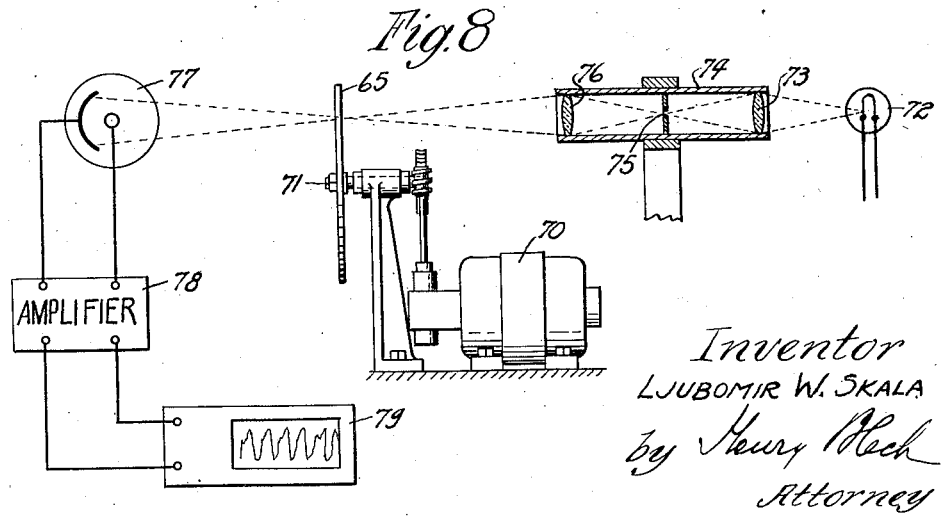
Inventor
LJUBOMIR W. SKALA
by Henry Hech
Attorney June 12, 1934.   L. W. SKALA   1,962,366
METHOD OF AND MEANS FOR EXAMINING AND PHOTOGRAPHICALLY
RECORDING AND REPRODUCING SPECTRA
Filed Dec. 6, 1930   3 Sheets-Sheet 3
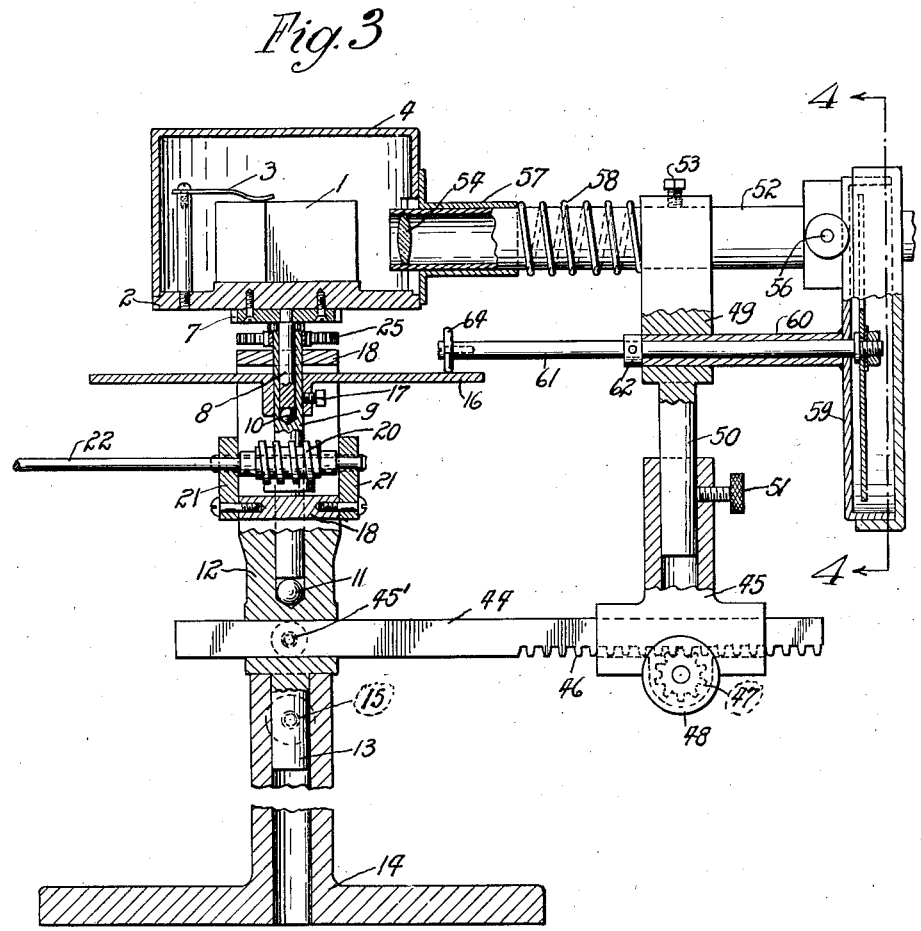
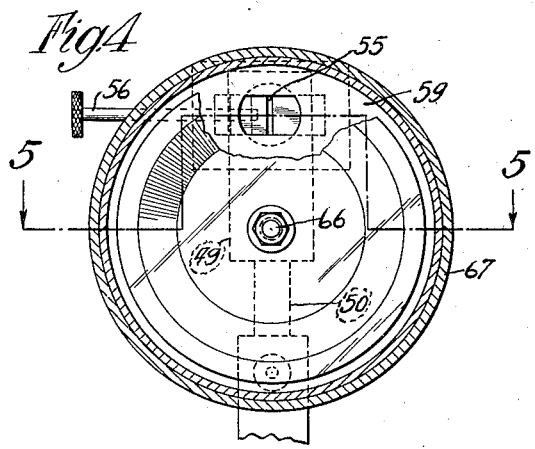
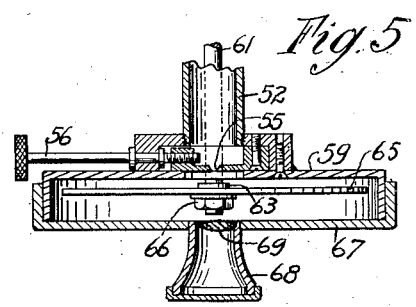
Inventor
LJUBOMIR W. SKALA
by Henry Hech
Attorney.

Patented June 12, 1934

1,962,366

UNITED STATES PATENT OFFICE 1,962,366

METHOD OF AND MEANS FOR EXAMINING AND PHOTOGRAPHICALLY RECORDING AND REPRODUCING SPECTRA

Ljubomir W. Skala, Cicero, Ill., assignor to Chicago Television & Research Laboratories, Inc., a corporation of Illinois Application December 6, 1930, Serial No. 500,568

9 Claims. (Cl. 88—14)

The invention relates to a novel method of, and means for examining and photographically recording and reproducing spectra.

The tendency in spectral analysis is to express the color values in terms of graphs of spectral intensity distribution, and such definition would be definite and readily reproducible were it not for the fact that the present color charts or color samples fade and that it is difficult to produce them uniformly.

It is also known that the determination of intensity of spectral lines can be made by measurements of the fluctuations of electric current from a photo-electric or selenium cell, as the negative is moved across a slit interposed between the cell and a source of light and an instrument of the most refined kind for this purpose is the Moll micro-photometer.

However, the method extant at present in recording spectra comprises the producing of spectra of the longitudinal type where the spectrum is spread and recorded on a photographic plate in a stripe or band, said plate being held stationarily during the exposure. In this method the distribution of the spectrum is dependent on the motion of the prism of constant deviation type or is dependent on the motion of the arm on which the photographic camera rests.

In the micro-photometric measurement of the distribution of the intensity of spectral lines the negative moves across the slit interposed between the cell and the source of light but again longitudinally.

The principal object of my invention consists in recording the spectrum in the form of a circle or ring by maintaining the photographic plate during exposure in rotary motion permitting also micro-photometric analysis by providing the rotating negative between the cell and the source of light.

A further object of the invention constitutes the production of a spectrum and magnifying the same into ring formation.

A still further object of the invention aims at magnifying a narrow region of a spectrum into ring formation.

Another object embraces the recording of spectra in ring formation of variable diameter and variable speed.

A further object aims at providing a recording apparatus of the type set forth which operates entirely automatic.

A still further object embraces the provision of a circular photographic camera and a circular photographic plate.

A further object constitutes the fact that the recording apparatus may be used selectively as a spectroscope, spectrometer, or spectrograph and that the spectrum distribution may be followed and measured throughout the time of photographic exposure.

A still further object aims at providing an automatic recording apparatus where the time of exposure and the spectrum distribution may be predetermined.

It is also an object of the invention to provide certain features of construction and arrangement of apparatus tending to enhance the utility and accuracy thereof.

With these and other objects in view which will become more apparent from a perusal of the invention, the latter comprises the sequence of steps of the new method and the means described in the following specification, particularly pointed out in the claims forming a part thereof, and illustrated in the accompanying drawings, in which:

Fig. 1 is a top plan view of my new recording apparatus constructed in accordance with the invention.

Fig. 2 is an elevational view of the appartus with parts shown in section, the section being taken on the line 2—2 of Fig. 1.

Fig. 3 is a sectional elevation, the section being taken on the line 3—3 of Fig. 2.

Fig. 4 is a section through the camera, the section being taken on the line 4—4 of Fig. 3.

Fig. 5 is a section on the line 5—5 of Fig. 4.

Fig. 6 is a front view of the photographic plate.

Fig. 7 shows a diagram of the circuit for the automatic operation of the recording apparatus, and Fig. 8 shows diagrammatically a system for producing a spectrum oscillogram.

Referring to the several views in the drawings 1 represents a glass prism of the constant deviation type supported on a circular table 2. A prism 1 is held in place by a spring 3. A prism cover 4 on the table 2 has two openings 5 and 6 respectively, to permit passage of the collimator and telescope tubes. To the lower side of the table 2 is secured a gear 7 which is fast on a center shaft 8 in co-axial relation and received in a bore of a main shaft 9. The small shaft 8 bears on a steel ball 10, and the lower end of the main shaft 9 rests in a similar way on a steel ball 11 at the bottom of a vertical bore in a holder 12. A rod 13 extends from the holder 12 and projects into the vertical central bore of an instrument base 14 and is secured against rotation by a screw 15.

The main shaft 9 extends concentrically through a plate 16 designated as ratio-plate provided with a hub and a set screw 17 secures the plate to the shaft 9. The main shaft 9 projects also through a U-frame 18 which is supported by the holder 12.

It is evident that by this arrangement the prism table 2 with the prism 1 and the ratio-plate 16 can be rotated independently of each other about the vertical axis of the whole instrument. Beneath the ratio-plate 16 and secured to the shaft 9 is a gear 19 which is driven by a worm 20. The worm 20 is fast on an insulating shaft 22 journaled in bearings 21 provided on the U-frame 18.

The shaft 22 of bakelite, glass, or the like is geared through a high ratio reduction gearing with an electric motor 23. The motor 23 may be connected to the instrument by a bracket (not shown) or it may be detached therefrom, as shown.

The ratio-plate 16 and the prism table 2 are geared to each other by a gear 24 secured to the main shaft 9 and by the idle gears 25 and 26 meshing respectively with gears 24 and 7.

It is evident that by changing the size of gears 7, 24, 25, and 26 there can be obtained any desired speed ratio between the table 2 respectively, prism 1 and the ratio-plate 16. The ratio between the angular velocity of the ratio-plate 16 and the prism 1 in my instrument can be expressed by the simple formula:

$$Tr < Tp$$

where $Tr$ is the angular velocity of the ratio-plate 16 and $Tp$ is the angular velocity of the prism 1.

This ratio is dependent first, upon the characteristics of the prism used and second, upon the characteristics of the camera system. It is obvious that to obtain the necessary ratio, any other kind of gearing might be used. A collimator tube 27 (Fig. 2) projects through a sleeve 28 and the opening 6 in the prism cover 4. On the prism end the collimator tube has a collimating lens 29 and on the opposite end a slit 30. The width of the slit is regulated by a screw 31, as will readily be understod by those versed in the art.

The collimator tube 27 is secured and held in correct position by a holder 32 arranged in bearings 33 fastened to the frame 18. The slit end of the collimator tube 27 bears the photographic shutter 34 with the release attachment 35 which is operated by an electro-magnetic release arrangement 36.

The electric circuit energizing the motor 23 and the electro-magnet 36 is shown diagrammatically in Fig. 7. The source of electric current shown at 37 might be direct current or rectified alternating current.

A main or starting switch 38 is provided and controls the electro-magnetic release arrangement 36 and the electric motor 23 which are connected in parallel. A spring contact 39 is secured as shown in Fig. 2 to the frame 18, and insulated from it by an insulator 40.

The spring contact 39 slides on the surface of the ratio-plate 16 which is either grounded or connected with the negative pole of the source of electricity 37, thus completing the electric circuit. On the ratio-plate 16 is fastened a strip of insulating material 41 such as mica, celluloid, bakelite, or the like. The function of this spring contact is evident. Upon rotation of the ratio-plate 16 in the direction of the contact spring 39 the insulating segment 41 will come under the spring 39 and break the electric circuit as outlined in Fig. 7. The time during which the circuit is closed depends upon the position of the insulating segment 41 and determines also the time of exposure in conjunction with the speed of the ratio-plate 16 and the prism 1 respectively of the motor 23. It is again evident that any other kind of circuit breaking arrangement within the scope of the invention might be utilized.

A light source 42 is in front of the slit 30 and a sample cell 43 is interposed.

A camera holding arm 44 is secured to the instrument base 14 by the aid of a collar and set screw 45'. To the outer end of the arm 44 is secured the camera holder 45 which can be moved longitudinally by the rack formation 46 of the arm 44 and the pinion 47 having a screw head 48. A support 49 for the telescope tube and the camera shaft is seated with an integral extension inserted in a socket of holder 45 and secured in position by a set screw 51.

A telescopic tube 52 passes through an opening in the support 49 and is secured in position by a set screw 53. The telescopic tube 52 is similar to the collimator tube 27 and contains a lens 54 and a slit 55 (Fig. 5) on the camera end. The width of the slit 55 is regulated by a screw 56.

A flanged collar 57 surrounds the telescopic tube 52 and is pressed against the prism chamber 4 by a spring 58 arranged between the collar and the support 49. The slit end of the telescope tube 52 is connected with the inner side 59 of the circular photographic camera. The bottom 59 of the camera is connected with a tube 60 also fastened to the holder 49. The tube 60 serves as a bearing for the camera shaft 61 which is held in the position by a collar 62 abutting the support 49 and by a washer 63 inside the photographic camera.

The camera shaft 61 has secured on one end a friction wheel 64 and on the other end the circular photographic plate 65 secured to the shaft 61 by a screw 66. A circular cover 67 for the photographic camera, which slides on an annular flange of the camera bottom 59. To the camera cover 67 is secured an eye-piece 68 with a magnifying lens 69 through which the magnified picture of the slit 55 (Fig. 5) can be observed.

It is evident from the drawing if the friction wheel 64 is pressed against the rotating ratio-plate 16 by lowering the camera holder 49, then the shaft 61 and also the photographic plate 65 fastened on the other end of the shaft will rotate. The form of the photographic plate is shown in Fig. 6 and has the center hole 65a for the passage of the shaft 61. The diameter of this photographic plate is slightly smaller than the diameter of the camera and the distance between the photographic plate 65 and the slit 55 is governed by the thickness of the ring 63 and is held as small as possible.

It is obvious that instead of a glass plate a circular film with a center hole may be used. The emulsion of the photographic plate or film does not per se form a part of the invention because any kind of photographic emulsion utilized in spectroscopic work may be applied to the glass or celluloid disk of the above described form.

The operation of the instrument is as follows:

The beam of light passing through the slit 30 in the collimator tube 27 (Fig. 1) is made parallel by the lens 29 and is incident to the constant deviation prism 1. From the prism 1 the light enters the telescopic tube 52 and the parallel beam is made convergent by the lens 54 and focused on the slit 55 (Fig. 5). By the rotation of the prism 1 the whole spectrum can be played over the slit 55, and the distribution can be observed and examined individually through the eye-piece 68 and the lens 69 on the camera.

In this form the instrument is used as a spectroscope. Supposing now that the friction wheel 64 on the shaft 61 presses against the ratio-plate 16 (Fig. 3) then it is evident that through the rotation of the ratio-plate 16, also the friction wheel 64 and the shaft 61 together with the photographic plate 56 will rotate, and the light rays emerging from the slit 55 will be recorded on the rotating plate 65 in a ring form shown in Fig. 6. After the photographic plate is developed the spectrum is recorded and appears in ring form as shown in Figs. 4 and 6. In this form the instrument is used as a spectrograph.

For direct measurement of the light in wave lengths or frequencies instead of the photographic plate a glass plate of the same form is used which bears a scale in wave lengths or in frequencies in the spectral circle in front of the slit 55. The rotating scale in front of the slit enables the reading of spectrum distribution in wave lengths or frequencies. In this form the instrument is used as a spectrometer. It is evident that in the camera both plates viz. first the photographic plate and then a photographic plate with the scale plate may be used. This arrangement enables us to record the spectrum on the photographic plate and simultaneously observe it through the scale plate during exposure and so check up the recorded spectrum which is predetermined by the mechanical adjustment of the instrument, as presently explained.

The ratio between the photographic plate 65 respectively the friction wheel 64 and the ratio-plate 16 may be expressed by the formula $$2r\pi = R\theta$$

where $r$ = Radius of the friction wheel 64
$R$ = Radius of the contact circle of the ratio-plate 16 with the wheel 64.
$\theta$ = The predetermined angle of partial rotation of plate 16.

In other words, the length of the sector of the contact circle on the ratio-plate 16 must be always equal to $2r\pi$, viz. to the circumference of the friction wheel 64 or to the circumference of 360° of the photographic plate.

It is evident that by changing either of these two factors R or $\theta$ in a certain mutual relation we can always obtain the same result of $2r\pi$, which means in practice one complete revolution of the photographic plate 65.

It will be readily understood from the foregoing that by decreasing the angle $\theta$ and simultaneously increasing the radius R the products equals $2r\pi$, so that it is possible to record on the photographic plate 65 as a complete ring a certain predetermined part or region of the spectrum, or in other words I can change at will the ratio $2r\pi$ of the photographic plate or the length of the spectrum recorded and $\alpha$ representing the angle of rotation of the constant deviation prism 1. In practice it means that by changing the gearing between the prism 1 and the ratio-plate 16 we effect the angle of rotation of the ratio-plate 16 and by the longitudinal adjustment of the camera by the rack and pinion arrangement 46 and 47 we can change at will the radius R.

The time of the photographic exposition can be derived from the formula $$S = R\theta \quad T_e = \frac{R\theta}{\omega t} = \frac{S}{\omega}$$

where $R$ = Radius of the touching circle on the plate 16
$\theta$ = Angle of rotation of plate 16
$\omega$ = Angular velocity
$S$ = Length of the sector on plate 16
$t$ = time.

It is evident that by maintaining the product $R\theta$ which represents the lengths of the sector, constant, and by simultaneously changing of the product $\omega t$, we can change at will the time of photographic exposure. This is accomplished in practice by changing the speed of the motor 23 whereby the exposure time and the necessary set up of the instrument for different photographic plates and spectra can be easily computed.

It is also evident from the above that the interval between two spectral lines can be computed and expressed in a different form than known today, which will be very useful in future spectroscopic work.

The diagrammatic representation of the apparatus for oscillographic reproduction of ring spectra is represented in Fig. 8.

The circular photographic negative 65 is secured to a shaft 71 driven by a motor 70. The speed of the motor 70 and of the photographic negative 65 is under the control of the operator in any known way either mechanically or electrically. The light rays from a lamp 72 are focused through the lens 73 in an optical tube 74 on a slit 75 which is of variable width. The picture of the slit 75 is focused through a lens 76 on the spectral ring of the photographic negative 65, passing the negative the light rays strike a photoelectric cell 77 which is connected through an amplification system 78 of any suitable type with an oscillograph 79 of any suitable construction.

By setting the photographic negative 65 in motion there is received on the oscillograph 78 a corresponding spectrum oscillogram.

In this method of micro-photometric spectrum analysis, the frequency of the corresponding wave to the analyzed spectrum will be dependent beside the known factors, also on the following formula:

$$T = \frac{Rs\theta}{\omega t}$$

where $T$ = Interval between two spectral lines
$Rs$ = Main radius of the spectral ring on the negative
$\theta$ = Angle between two spectral lines on the negative
$\omega$ = Angular velocity of the negative
$t$ = Time.

It is also evident that by the rotation of the negative 65 with a constant speed I will obtain a sine oscillographic curve for the whole spectral group under observation.

The frequency respectively the period of this spectral group wave, which I term the "group-frequency" or "period" may be expressed simply by:

$$F = \frac{\omega}{2\pi}$$

when measured in radians or $$F=\frac{\omega}{360°}$$

when measured in degrees.

The period is evident from the formula:

$$T=\frac{2\pi}{\omega}$$

where $\omega$ is the angular velocity of the negative. All these factors as evident can be changed at will.

While the drawings show a preferred embodiment of the invention, numerous changes and alterations may be made without departing from the spirit of the invention.

I, therefore, do not limit myself to the details of construction and arrangement as shown but wish to include all modifications, rearrangements, and changes constituting departures within the scope of the invention as claimed in the appended claims.

I claim:

1. In an apparatus for recording a spectrum, means for moving a spectrum producing prism, and means for producing photographically a ring spectrogram, said last means being operatively connected with and adjustable to said first named means to be actuated at variable speeds.

2. In an apparatus for producing and recording a spectrum, means for moving a spectrum producing prism, and means actuated by said first named means for reproducing said spectrum as an annular spectrogram said last named means being actuated at a speed other than said first named means.

3. In an apparatus for producing and recording a spectrum, a spectrum producing prism, means for moving said prism, and means actuated by said first named means for reproducing photographically a selected portion of said spectrum as an annular spectrogram said last named means moving at a rate other than said first named means.

4. An apparatus for producing and recording a spectrum, including a prism, means for actuating said prism, a sensitized disk, means operatively connected with said first named means to rotate said disk to produce a ring spectrogram, and means for predetermining the time of photographic exposure.

5. An apparatus for producing and recording a spectrum, including a prism, automatic means for moving said prism, a sensitized disk, and means actuated by said first named means to rotate said disk at a predetermined rate.

6. An apparatus for producing and recording a spectrum, including a prism, automatic means for moving said prism, a sensitized disk, an adjustable support carrying said disk, and means operatively connected with said first named means for rotating said disk.

7. An apparatus for producing and recording a spectrum, including means for rotating a spectrum producing prism, a sensitized disk in the path of the light beam passing through said prism, and means actuated by said first named means to rotate said disk at an angular velocity other than that of said prism.

8. An apparatus for producing and recording a spectrum, including a prism, automatic means for moving said prism, a sensitized disk, and means adjustable to and actuated by said first named means to rotate said disk at a predetermined rate.

9. In the art of recording a spectrum which employs a constant deviation prism and a sensitized disk, the method of causing a light beam to be incdent to said prism, rotating said prism at a predetermined angular velocity causing said light beam to reach said sensitized disk and rotating said sensitized disk at a predetermined rate to produce a ring or circular spectrogram.

LJUBOMIR W. SKALA.